July 29, 1941.      M. E. BIVENS      2,251,237
ELECTRIC VALVE CONTROL SYSTEM
Filed June 29, 1940

Inventor:
Maurice E. Bivens,
by Harry E. Dunham
His Attorney.

Patented July 29, 1941

2,251,237

UNITED STATES PATENT OFFICE 2,251,237

ELECTRIC VALVE CONTROL SYSTEM

Maurice E. Bivens, Schenectady, N. Y., assignor to General Electric Company, a corporation of New York Application June 29, 1940, Serial No. 343,220

5 Claims. (Cl. 250—27)

My invention relates to electric valve apparatus and more particularly to control or excitation circuits for electric valve translating apparatus of the type employing an ionizable medium, such as a gas or a vapor.

Electric valves or electric discharge devices which comprise make-alive or immersion-igniter type control members afford an economical and convenient arrangement for controlling the transfer of electric power to a load circuit from an alternating current supply circuit. For example, electric valve apparatus of this nature has been found to operate very satisfactorily in effecting intermittent or periodic energization of welding circuits energized from alternating current supply circuits. In accordance with the teachings of my invention described hereinafter, I provide a new and improved electric translating circuit which affords additional flexibility of control and which offers additional advantages in apparatus economy.

It is an object of my invention to provide a new and improved electric valve translating circuit.

It is another object of my invention to provide a new and improved control circuit for electric valve translating apparatus of the type employing make-alive or immersion-igniter control members.

Briefly stated, in the illustrated embodiment of my invention I provide an electric translating circuit for transmitting alternating current to a load circuit, such as a welding circuit, from an alternating current supply circuit through a pair of reversely connected electric valves which are of the type including make-alive or immersion-ignitor control members in contact with the associated cathodes. Each of the electric valves is provided with an excitation circuit and the excitation circuits are interconnected through a control circuit comprising a pair of reversely connected electric discharge devices for selectively advancing and retarding the time during the applied positive half cycles of anode-cathode voltage at which the critical ignition currents are transmitted to the immersion-igniter control members.

Figure 1:
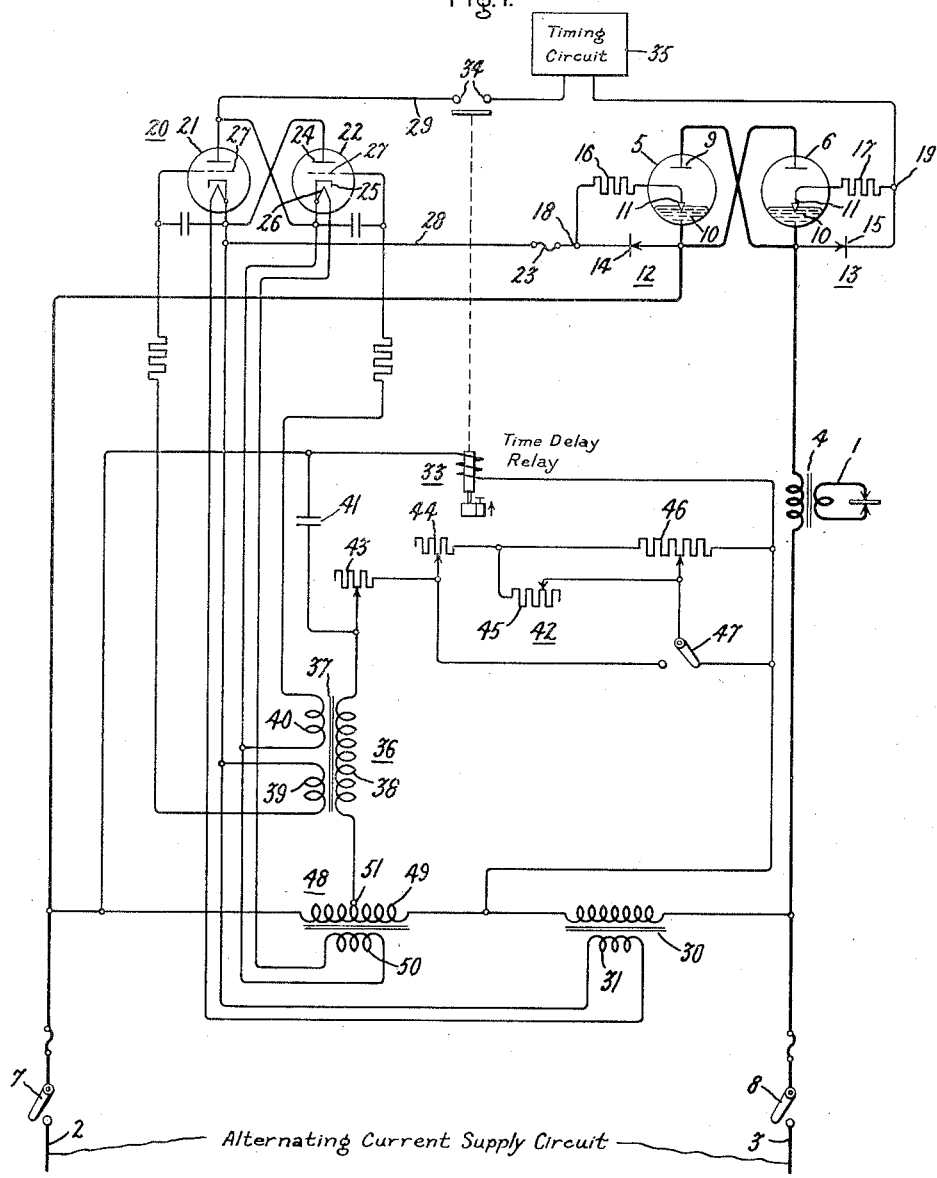
Figure 2:
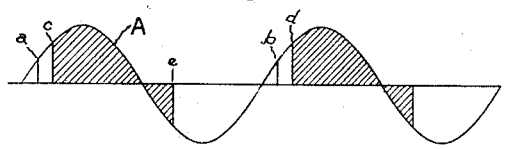

For a better understanding of my invention, reference may be had to the following description taken in connection with the accompanying drawing, and its scope will be pointed out in the appended claims. Fig. 1 diagrammatically illustrates an embodiment of my invention as applied to a system for energizing a welding circuit, and Fig. 2 represents certain operating characteristics thereof.

Referring now to Fig. 1, I have illustrated my invention as applied to an electric valve translating system for energizing a load circuit, such as a welding circuit 1, from an alternating current supply circuit, including conductors 2 and 3, through a transformer 4 and a pair of reversely connected electric valve means 5 and 6. Suitable switches 7 and 8 may be connected in circuit with the translating apparatus. The electric valve means 5 and 6 are of the type employing an ionizable medium, such as a gas or a vapor, and each comprises an anode 9, a cathode such as a mercury pool cathode 10, and a make-alive or immersion-igniter control member 11 having an extremity thereof immersed below the surface of the mercury pool cathode. The immersion-igniter control members 11 are constructed of a material, such as boron-carbide or silicon-carbide, having a specific electrical resistivity substantially greater than that of the associated mercury pool cathode.

I provide a pair of excitation circuits 12 and 13 associated with electric valves 5 and 6, respectively, and including suitable rectifying means or unidirectional conducting devices 14 and 15 and resistances 16 and 17, respectively. The rectifying devices 14 and 15 are poled to transmit current from one side of the alternating current supply circuit to the control member of the other electric valve means through a circuit to be described immediately hereinafter. Devices 14 and 15 maintain the negative voltage applied to the control members 11 at a low value.

Connected between the common junctures 18 and 19 of unidirectional conducting devices 14, 15 and resistances 16, 17 of excitation circuits 12 and 13, respectively, I provide a control circuit 20 for selectively advancing and retarding the times during the positive half cycle of applied anode-cathode voltage at which the electric valves 5 and 6 are rendered conductive. More specifically, I provide a pair of reversely or inversely connected electric discharge devices 21 and 22 connected between the common junctures 18 and 19 of excitation circuits 12 and 13. A suitable current limiting device, such as a fuse 23, may be connected in series relation with the electric discharge devices 21 and 22, if desired. The electric discharge devices 21 and 22 are preferably of the type employing an ionizable medium, such as a gas or a vapor, and each may comprise an anode 24, a cathode 25 having a heating element 26, and a control member or grid 27. The cathode of discharge device 21 is connected to juncture 18 through a conductor 28 and the anode of discharge device 21 is connected to the juncture 19 through a conductor 29 and apparatus to be described hereinafter.

The cathode heating elements 26 of electric discharge devices 21 and 22 may be energized from the alternating current supply circuit. A transformer 30 is provided having a secondary winding 31 connected to the cathode heating element of electric valve means 21. In order to delay the closure of the anode-cathode circuits of the electric discharge devices 21 and 22 to permit the cathodes thereof to assume a safe operating temperature, I employ a time delay relay 33 having contacts 34 connected in series relation with the anode-cathode circuits of the discharge devices 21 and 22. Upon closure of the switches 7 and 8, relay 33 is energized to initiate the timing operation and after the lapse of a predetermined interval of time contacts 34 are closed.

A suitable timing circuit 35 may be connected in series relation with conductor 29, contacts 34 and electric discharge devices 21 and 22 to effect energization of the load circuit 1 during a predetermined interval of time, or to effect periodic energization of the load circuit 1 during predetermined recurring intervals of time. This timing circuit may comprise a pair of contacts (not shown) which are closed in the desired manner to complete the circuit which interconnects control circuit 20 and the excitation circuits 12 and 13.

In order to control the conductivities of the electric discharge devices 21 and 22, that is, to control the time during the cycles or half cycles of voltage of the alternating current supply circuit at which these electric valves begin to conduct current and to control thereby the conductivities of electric valve means 5 and 6, I provide a second control circuit 36, which may be of the phase shifting type, which impresses on the grids 27 of discharge devices 21 and 22 periodic or alternating voltages of adjustable phase position with respect to the voltage of the alternating current supply circuit. I employ a transformer 37 having a primary winding 38 and secondary windings 39 and 40 connected to grids 27 of electric discharge devices 21 and 22, respectively. The transformer 37, if desired, may be of the type designed to produce periodic or alternating voltages of peaked wave form. As an agency for supplying to the primary winding 38 an alternating voltage of controllable or adjustable phase position with respect to the voltage of the supply circuit, I employ a phase shifting circuit which may be of the static impedance type comprising a capacitance 41 in one arm thereof and comprising a variable resistance or impedance branch 42. The variable impedance branch may include adjustable resistances 43—46 and a switch 47 to afford various combinations of resistances and hence to obtain various preestablished phase positions of the voltages impressed on grids 27. The lower terminal of the primary winding 38 of transformer 37 may be connected to a suitable inductive device 48, such as a transformer, having a primary winding 49 and a secondary winding 50. The primary winding 49 is provided with an electrically intermediate connection 51 which is connected to the primary winding 38. Secondary winding 50 may be employed to energize cathode heating element 26 of electric discharge device 22.

The operation of the embodiment of my invention illustrated in Fig. 1 will be explained by considering the system when it is operating to transmit alternating current to the welding circuit 1 from the alternating current supply circuit. The electric valves 5 and 6 when in a conducting condition transmit alternating current through the primary winding of transformer 4. The amount of current transmitted to the welding circuit 1 is, of course, determined by the time during the positive half cycles of applied anode-cathode voltage at which the electric valve means 5 and 6 are rendered conducting. As the times of initiation of the arc discharges within electric valve means 5 and 6 are retarded from the zero point of the positive half cycle, the amount of energy transmitted to the welding circuit 1 during each cycle is decreased and, conversely, as these times are advanced in phase relationship with respect to the voltage of the supply circuit, the amount of energy transmitted to the load is increased. This control of electric valve apparatus is sometimes referred to as the "heat control."

Upon closure of switches 7 and 8, the time delay relay 33 is energized, and after the lapse of a predetermined interval of time, contacts 34 are closed thereby effectively connecting the control circuit 20 to the excitation circuits 12 and 13. The energization of the welding circuit 1 is controlled by means of the timing circuit 35 which may be arranged to effect a single energization of the load circuit 1 during a definite interval of time, or may be arranged to effect periodic or intermittent energization of the welding circuit 1 during recurring predetermined intervals of time.

The electric discharge devices 21 and 22 serve as a phase control means for determining the time during the positive half cycles of anode-cathode voltage at which electric valve means 5 and 6 are rendered conducting. It will be appreciated that in order to initiate an arc discharge within electric valve means 5 and 6, it is necessary to transmit to the control members 11 predetermined minimum amounts of current. In the absence of the phase control means, such as electric discharge devices 21 and 22, electric valve means 5 and 6 are rendered conducting at a predetermined definite time during the positive half cycles of applied anode-cathode voltage. For example, referring to curve A of Fig. 2 which represents the anode-cathode voltage applied to one of the electric valve means, such as electric valve means 5, the electric valve 5 would be rendered conductive at times $a$ and $b$, at which times the anode-cathode voltage has increased to a value sufficient to transmit to control member 11 the predetermined critical minimum value of current required to initiate the arc discharge. By means of the control circuit 20, the time of starting the electric valve means 5 and 6 may be delayed substantially beyond the times $a$ and $b$, such as to times $c$ and $d$. The shaded portion of Fig. 2, of course, represents the period of conduction of one of the power electric valves, such as electric valve means 5, for a load of a particular power factor. That is, the electric valve means 5 would begin to conduct current at time $c$ and conduct current to time $e$.

Considering more particularly the operation of the control circuit 20, the electric discharge devices 21 and 22 during the period of operation established by the timing circuit 35 conduct current alternately to initiate the periods of conduction of electric valve means 5 and 6. Let it be assumed that during one-half cycle of operation, when the conductor 3 of the supply circuit is positive relative to the conductor 2, electric valve means 5 is then in condition to transmit current inasmuch as its anode 9 is positive in potential with respect to its cathode 10. Current would initially tend to flow through the unidirectional conducting device 15, through the contacts of timing circuit 35, contacts 34, conductor 29, the anode-cathode circuit of electric discharge device 21, fuse 23, resistance 16, control member 11, cathode 10 of electric valve means 5 and conductor 2 of the supply circuit. However, the time of starting may be delayed depending upon the adjustment of the second control circuit 36 which determines the phase of the periodic voltage applied to grid 27 of electric discharge device 21. When the electric discharge device 21 is rendered conducting, the above circuit is completed and an impulse of current is transmitted to the control member 11 to render the electric valve means 5 conducting. As soon as the arc discharge within electric valve means 5 is initiated, the current conducted by electric discharge device 21 decreases to substantially zero value due to the decay of voltage between the anode 9 and the cathode 10 of electric valve means 5. Consequently, the electric discharge device 21 and, of course, the discharge device 22, conduct current only for short intervals of time in order to initiate the arc discharges within electric valve means 5 and 6. In like manner, during the half cycles of opposite polarity, that is, when conductor 2 is positive relative to conductor 3, the electric valve means 6 is rendered conductive at a definite instant during that half cycle determined by the time at which the electric discharge device 22 is rendered conducting. The circuit through which control member 11 of electric valve means 6 is energized comprises conductor 2, unidirectional conducting device 14, fuse 23, anode-cathode circuit of electric discharge device 22, conductor 29, contacts 34, timing circuit 35, resistance 17, control member 11 of electric valve means 6, cathode 10 and conductor 3 of the supply circuit. In this manner it will be appreciated that the amount of energy transmitted to the welding circuit 1 may be controlled by adjustment of circuit 36. Furthermore, it will be appreciated that the time at which electric valve means 5 and 6 are rendered conductive may be retarded beyond the times corresponding to points a and b of Fig. 2, thereby affording a substantial range of phase control or heat control.

The phase of the alternating voltages of peaked wave form impressed on control grids 27 of discharge devices 21 or 22 is controllable or adjustable by means of the resistances 43—46 and switch 47. This adjustment, of course, provides control of the amount of energy transmitted to the welding circuit 1 during each energization thereof.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, an alternating current load circuit, electric translating apparatus connected between said circuits and comprising a pair of reversely connected electric valve means each having an anode, a cathode and an immersion-igniter control member, a pair of excitation circuits one of which is connected between the control member and the cathode of one of said electric valve means and the other of which is connected between the control member and the cathode of the other of said electric valve means, and a control circuit connected between said excitation circuits for selectively advancing and retarding the time during the positive half cycles of anode-cathode voltage applied to said electric valves at which said electric valves are rendered conductive and comprising means for transmitting current from the excitation circuit associated with one of the electric valve means to the excitation circuit associated with the other electric valve means.

2. In combination, an alternating current supply circuit, an alternating current load circuit, electric translating apparatus connected between said circuits and comprising a pair of reversely connected electric valve means each having an anode, a cathode and an immersion-igniter control member, a pair of excitation circuits one of which is connected between the control member and the cathode of one of said electric valve means and including a unidirectional conducting device poled to transmit current from the supply circuit to the control member of the other electric valve means and the other excitation circuit of which is connected between the control member and the cathode of the other electric valve means and including a unidirectional conducting device poled to transmit current from the supply circuit to the control member of the one electric valve means, and a control circuit connected between said excitation circuits for selectively advancing and retarding the time during the positive half cycles of anode-cathode voltage applied to said electric valve means at which said electric valve means are rendered conductive and comprising means for transmitting current from the excitation circuit associated with one of the electric valve means to the excitation circuit associated with the other electric valve means.

3. In combination, an alternating current circuit supply circuit, a load circuit, electric translating apparatus connected between said circuits and comprising a pair of reversely connected electric valve means each having an anode, a cathode and an immersion-igniter control member in contact with the associated cathode and requiring the transmission of a predetermined critical value of current through the control member to initiate an arc discharge between said anode and said cathode, a pair of excitation circuits one of which is connected between the control member and the cathode of one of said electric valve means and the other of which is connected between the control member and the cathode of the other electric valve means, and a circuit connected between said excitation circuits for selectively advancing and retarding the time at which the critical current is transmitted to the control members during the positive half cycles of applied anode-cathode voltage to control an electrical condition of said load circuit and comprising means for transmitting current from the excitation circuit associated with one of the electric valve means to the excitation circuit associated with the other electric valve means.

4. In combination, an alternating current supply circuit, an alternating current load circuit, electric translating apparatus connected between said circuits and comprising a pair of reversely connected electric valve means each having an anode, a cathode and an immersion-igniter control member, a pair of excitation circuits one of which is connected between the control member and the cathode of one of said electric valve means and including a unidirectional conducting device poled to transmit current from the supply circuit to the control member of the other electric valve means and the other excitation circuit of which is connected between the control member and the cathode of the other electric valve means and including a unidirectional conducting device poled to transmit current from the supply circuit to the control member of the one electric valve means, and a control circuit comprising a pair of reversely connected control electric discharge devices for selectively advancing and retarding the time during the positive half cycles of anode-cathode voltage applied to said electric valves at which said electric valves are rendered conductive.

5. In combination, an alternating current supply circuit, an alternating current load circuit, electric translating apparatus connected between said circuits and comprising a pair of reversely connected electric valve means each having an anode, a cathode and an immersion-igniter control member, a pair of excitation circuits one of which is connected between the control member and the cathode of one of said electric valve means and including a unidirectional conducting device poled to transmit current from the supply circuit to the control member of the other electric valve means and the other excitation circuit of which is connected between the control member and the cathode of the other electric valve means and including a unidirectional conducting device poled to transmit current from the supply circuit to the control member of the one electric valve means, a control circuit connected between said excitation circuits and comprising a pair of reversely connected electric discharge devices for selectively advancing and retarding the time during the positive half cycles of anode-cathode voltage applied to said electric valve means at which said electric valve means are rendered conductive, each of said electric discharge devices having a control grid, and means for impressing on the control grids periodic voltages of adjustable phase position to control the conductivity of said electric discharge devices.

MAURICE E. BIVENS.